United States Patent [19]
Geboers

[11] Patent Number: 5,101,429
[45] Date of Patent: Mar. 31, 1992

[54] ELECTRONIC TELEPHONE SET

[75] Inventor: Josephus J. A. Geboers, Eindhoven, Netherlands

[73] Assignee: U.S. Philips Corporation, New York, N.Y.

[21] Appl. No.: 512,696

[22] Filed: Apr. 23, 1990

[30] Foreign Application Priority Data

Apr. 24, 1989 [NL] Netherlands ............ 8901018

[51] Int. Cl.$^5$ .................... G06F 3/02; H04M 1/26
[52] U.S. Cl. .................... 379/368; 379/341; 341/22; 341/23; 341/26; 341/32
[58] Field of Search .............. 379/368, 341, 110; 341/22, 23, 26, 32, 33

[56] References Cited

U.S. PATENT DOCUMENTS

| | | | |
|---|---|---|---|
| 4,061,886 | 12/1977 | Callahan, Jr. et al. | 379/368 X |
| 4,234,872 | 11/1980 | Halder | 341/26 |
| 4,277,780 | 7/1981 | Sonderman et al. | 341/26 |
| 4,288,787 | 9/1981 | Serras-Paulet | 341/26 |
| 4,495,485 | 1/1985 | Smith | 379/368 X |
| 4,667,181 | 5/1987 | Hastreiter | 341/26 |
| 4,686,880 | 8/1987 | Salani et al. | 341/26 X |
| 4,725,816 | 2/1988 | Petterson | 341/26 |

FOREIGN PATENT DOCUMENTS

| | | | |
|---|---|---|---|
| 0187021 | 7/1986 | European Pat. Off. | 341/26 |
| 3544153 | 6/1987 | Fed. Rep. of Germany | 341/26 |
| 0159328 | 10/1982 | Japan | 341/22 |
| 0181139 | 10/1983 | Japan | 341/22 |
| 0065348 | 4/1984 | Japan | 341/26 |

OTHER PUBLICATIONS

J. Geboers, "Telephone Set Controller PCD 3344/047 (up to) 13 Number Repertory Pulse/Tone Dialler", Report No. ETT89015, Sep. 1989, pp. 1-28.
J. Gebbers and H. van Loon, "Controller (PCD 3344/006) Programmed for Telephone Sets with On-hook Dialling and Up To 20 Numbers Repertory Dial Facilities", Laboratory Report NO. ETT8805, Jul. 1988, 1-24.

Primary Examiner—James L. Dwyer
Assistant Examiner—Magdy W. Shehata
Attorney, Agent, or Firm—Anne E. Barschall

[57] ABSTRACT

Electronic telephone set, comprising a transmission circuit arranged for being coupled to a telecommunication network and for receiving and transmitting speech signals, a keyboard means comprising a first matrix with respective numbers of intersecting first and second conductors and at the intersections of the first and second conductors key switches coupled to the respective first and second conductors for producing dial information and status information and including a second matrix with one intersecting first and second conductor or a plurality thereof respectively, and having setting circuits conducting current in one and the same direction coupled to the respective first and second conductors at selected intersections of the latter first and second conductors, whereas all second conductors of the second matrix are arranged common to those of the first matrix, and including a control circuit arranged for generating dialling signals compatible with the telecommunication network in response to the dialling information produced by the keyboard means and controlling the operation of the telephone set in response to the status information produced by the keyboard means, which control circuit comprises scanning means for reading the two matrices, characterized in that all first conductors of the second matrix are in common with those of the first matrix and in that the scanning means scan the first conductors when reading the first matrix and scan the second conductors when reading the second matrix.

6 Claims, 3 Drawing Sheets

ELECTRONIC TELEPHONE SET

BACKGROUND OF THE INVENTION

The invention relates to an electronic telephone set. The set includes a transmission circuit for being coupled to a telecommunication network and for receiving and transmitting speech signals. The set also includes keyboard means comprising a first matrix with respective numbers of intersecting first and second conductors. At the intersections of the first and second conductors, key switches are coupled to the respective first and second conductors for producing dial information and status information. The keyboard means also includes a second matrix with one intersecting first and second conductor or a plurality thereof respectively. At selected intersections of the latter first and second conductors, setting circuits are coupled to the respective first and second conductors. The setting circuits conduct current in one and the same direction. All second conductors of the second matrix are arranged in common with those of the first matrix. The set also includes a control circuit arranged for generating dialling signals compatible with the telecommunication network in response to the dialling information produced by the keyboard means and controlling the operation of the telephone set in response to the status information produced by the keyboard means, which control circuit comprises scanning means for reading the two matrices.

Such an electronic telephone set is known from the publication of Philips Components Laboratory Report No. ETT 8805 by Jos Geboers and Hans van Loon, "Controller (PCD3344/006) Programmed for Telephone Sets with On-hook Dialling and up to 20 Number Repetory Dial Facilities", August 1988, Eindhoven, the Netherlands; specifically the block diagram on page 2 and FIG. 6 on page 8 with the relevant descriptions, especially part 4.9.2 of this report.

The transmission circuit may be an integrated circuit of the TEA 1060 family, whereas the control circuit may be an integrated circuit of the PCD 3340 family. The transmission circuit is arranged for being coupled to a telecommunication network, in the case described in the above report, by coupling its line terminals to a telephone line. Another option is that the transmission circuit is coupled to a transceiver means for radio connection to a telecommunication network. In the prior-art electronic telephone set the transmission circuit is fed from the line as is the control circuit via the transmission circuit. Alternatively, however, it is possible to have the above transmission and control circuits comprise a supply circuit which is line-independent or to feed the control circuit by means of a supply circuit, for example, the integrated circuit TEA 1081 mentioned in the publication referred to, which is used there for feeding an amplifier circuit, that is to say, the integrated circuit TEA 7050. In the prior-art electronic telephone set the transmission circuit receives speech signals from a microphone and delivers speech signals to an earphone.

Finally, the prior-art electronic telephone set comprises a keyboard means with a matrix of key switches for producing dial information, such as a telephone number. The control circuit reads the matrix of key switches and generates dial signals which are compatible with the telecommunication network, such as pulse dial signals or tone dial signals, in response to the dial information read. In the former case there is an electronic interruptor (BSN 254) inserted in the connection line between a line terminal of the transmission circuit and the telephone line, which interruptor is controlled by the pulse dial signals generated by the control circuit. In the latter case a tone dial generator (DTMF generator) comprised in the control circuit generates tone dial signals which are applied to the telephone line by means of the transmission circuit.

The keyboard means of the prior-art electronic telephone set also includes a matrix of setting units such as diodes (in the above publication referred to as diode straps) which are conductive in one direction. This diode matrix may be instrumental in setting status information, for example, by physically or electrically removing selected diodes from the diode matrix, for example, the PTS "wire bridge" diode for setting the pulse dial type of operation. Also the matrix relating to the key switches is used for producing status information, for example, by storing keyed-in dial information in the memory. Basically, with the diode matrix the status information is set only once, whereas this status information can be set again and again with the key switch matrix.

The keyboard means of the prior-art electronic telephone set will now be further discussed with reference to FIG. 6 of the above report. As it has been shown, and if it has not, it will be evident to those skilled in the art, the keyboard means comprises a first matrix of key switches with a respective plurality (eight, eight) of intersecting first conductors (Row 1-Row 5) and second conductors (Col 1-Col 8) and a second matrix having various (i.e. two) or a plurality respectively, (in this case eight, just like the first matrix) of intersecting first conductors (Row 6-Row 7) and second conductors (Col 1-Col 8), all second conductors of the second matrix being in common with those of the first matrix. Consequently, 2×8=16 setting options are realised which, for that matter, and as shown schematically, need not all be used. The control circuit comprises scanning means for reading dial information and the status information in a program-controlled fashion. The latter information determines, in a program-controlled manner, the operation of the central processor in the control circuit. So, the diode matrix can, for example, be used for adapting the electronic telephone set to specific country requirements or for manufacturing specific types of telephone sets.

As has been stated hereinbefore, the prior-art set has sixteen status options. This will cost two integrated circuit pins (see page 3 of the above publication). This is advantageous because the same resetting options would require sixteen pins when using switches such as DIP microswitches.

SUMMARY OF THE INVENTION

It is an object of this invention to further improve the prior-art electronic telephone set by reducing the total number of conductors of the matrices of the keyboard means while at least maintaining the same potential so that the control circuit in the form of an integrated circuit will manage with fewer connecting pins or will be able to use the vacant connecting pins for different purposes.

Therefore, the invention provides an electronic telephone set of the type mentioned in the preamble, characterized in that all first conductors of the second matrix are in common with those of the first matrix and in that the scanning means scan the first conductors when reading the first matrix and scan the second conductors when reading the second matrix.

Worded briefly, according to the invention the matrices are arranged in parallel saving on two connecting pins in the case under discussion and requiring only to adapt the programming of the control circuit.

As with the prior-art electronic telephone set, the setting units may be diodes.

The arrangement of the electronic telephone set according to the invention need not be the same as that of the prior-art electronic telephone set; however, it is essential that it comprise a keyboard and that (a single) setting of its operation is possible. In this way the invention can be advantageously used in a cordless telephone set, whereas it is desirable to safeguard this with an identification or security code. With a diode matrix of four-by-four a 16-bit identification word is thus possible, implying 65,536 different security codes.

Naturally, specifically for those skilled in the art, there are still many more types of status information possible, basically to be set only once, which can all be implemented with an electronic telephone set according to the invention. It may even be considered that the parallel arrangement of a diode matrix and a keyboard matrix with means for reading one matrix in one direction and the other matrix in the other can be used in equipment other than telephone sets; which, for that matter, also falls within the scope of the present invention.

BRIEF DESCRIPTION OF THE DRAWING

The invention will now be further explained with the aid of its use in a cordless telephone set and with reference to the drawing Figures, in which.

DETAILED DESCRIPTION OF THE PREFERRED EMBODIMENTS

Figure 1:
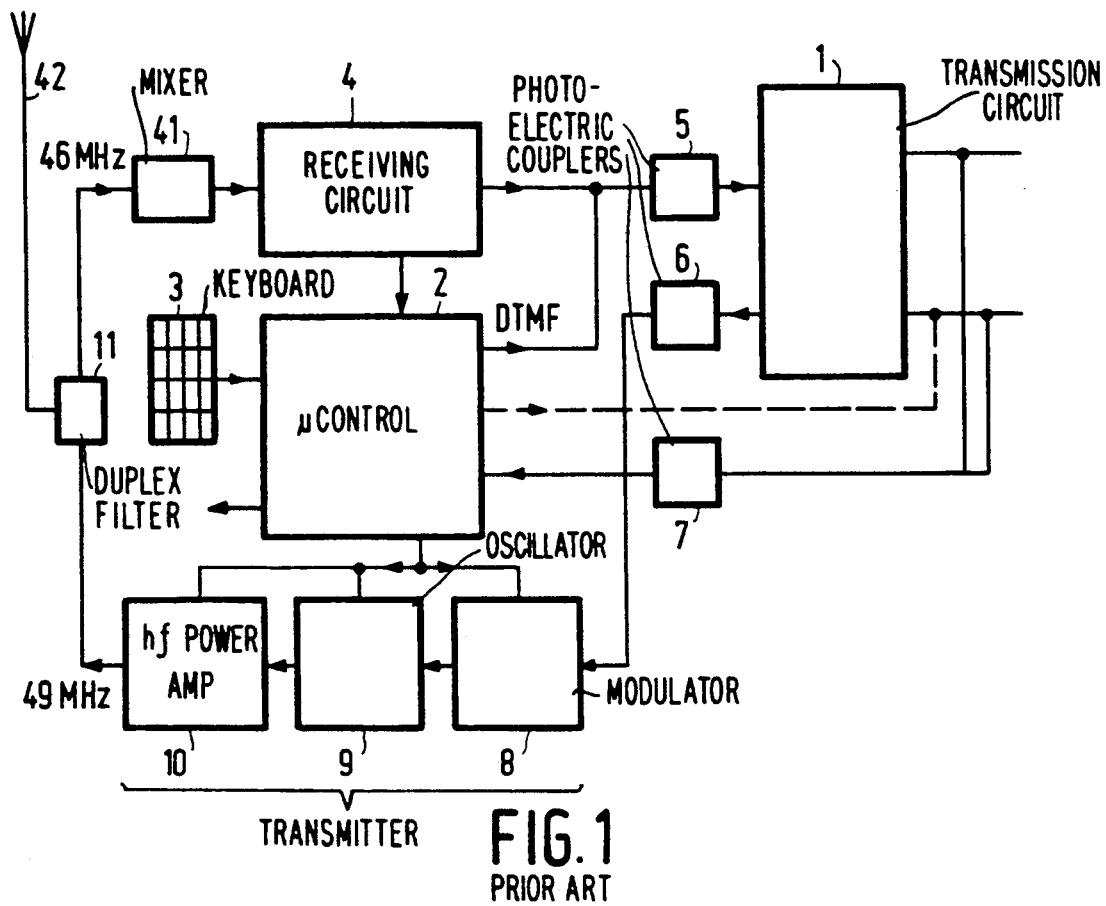
FIG. 1 shows a block diagram of the base unit of a cordless telephone set.

In FIG. 1 is shown the transmission circuit 1 connected to a telephone line. The transmission circuit 1 receives speech signals through a photo-electric coupler 5 from a receiving circuit 4, which in its turn supplies information to a microcontrol circuit 2 which receives information from keyboard means 3 and transmits tone dial information DTMF to the transmission circuit 1, again via photo-electric coupler 5. A transmitter means comprising the series arrangement of a modulator 8, oscillator 9 and hf power amplifier 10 receives, via photo-electric coupler 6, speech signals from the transmission circuit 1. The control circuit 2 delivers release signals to the modulator 8, oscillator 9 and hf power amplifier 10. The micro-control circuit 2 finally receives ringing signals from the telephone line via photo-electric coupler 7. The transmitter means 8, 9 and 10 transmits modulated speech signals into the air at a first frequency, for example, 49 MHz, via a duplex filter 11 and the aerial 42. The receiving circuit 4 receives through the air via the mixer 41 speech signals modulated at a second frequency, for example 46 MHz, by means of the duplex filter 11 and aerial 42. As indicated by a dashed line the control circuit 2 can supply dial pulses in lieu of dial tones to the telephone line.

All blocks shown in FIG. 1 are considered to be well known. The transmission circuit 1 may again be an integrated circuit of the TEA 1060 family. The receiving circuit 4 may be the integrated circuit NE 614 or the integrated circuit MC 3361 in combination with PLL-IC NE 567. The photo-electric couplers 5, 6 and 7 may be the ones with the type-references CNG 36 and CNX 38. The mixer 41 may be the integrated circuit NE 612. The transmitter 8, 9 and 10 may be composed of discrete components, whereas for the UHF frequency band use can be made of amplifier modules such as BGY 95 and BGY 90. The integrated circuit BCD 3344 may be used for the control circuit 2. This is a micro-control switch with an 8-bit central processor unit, DTMF generator and RAM housed on the same chip.

Data communication is attained by sending a pilot tone which is turned on and off by the data output of the control circuit 2. Via the integrated phase control loop circuit NE 567 the received pilot tones are converted into digital data for the control circuit 2. The frequency of the pilot tone is just outside the telephone speech band, so that data transmission during conversation mode is an option. If the telephone set is used for pulse dialling, a transistor of the BSN 254A type may be used as a telephone line interruptor (not shown).

The architecture of the hand held unit of the telephone set, which is shown by way of a block diagram in FIG. 2, will now be discussed. The hand held unit of the telephone set comprises a control circuit 12, for example the integrated circuit PCD 3343, a keyboard means 13, a receiving circuit 14 which may also be an integrated circuit NE 614 or MC 3361, a transmitter means which may also be composed of a modulator 18, oscillator 19 and hf power amplifier 20 but which transmits modulated speech signals at a frequency of 46 MHz, a duplex filter 21 which is connected to both a receive filter 15 and the transmitter means 18, 19 and 20, as well as the aerial 43, and, finally, amplifiers 16, 17 and 40 receiving speech signals from the receiving circuit 14 and passing on amplified versions thereof to a buzzer (not shown). The control circuit 12 receives information from receiving circuit 14, dial information and status information from the keyboard means 13 and applies release signals to the amplifiers 16 and 40 and the modulator 18, oscillator 19 and hf power amplifier 20.

Figure 2:
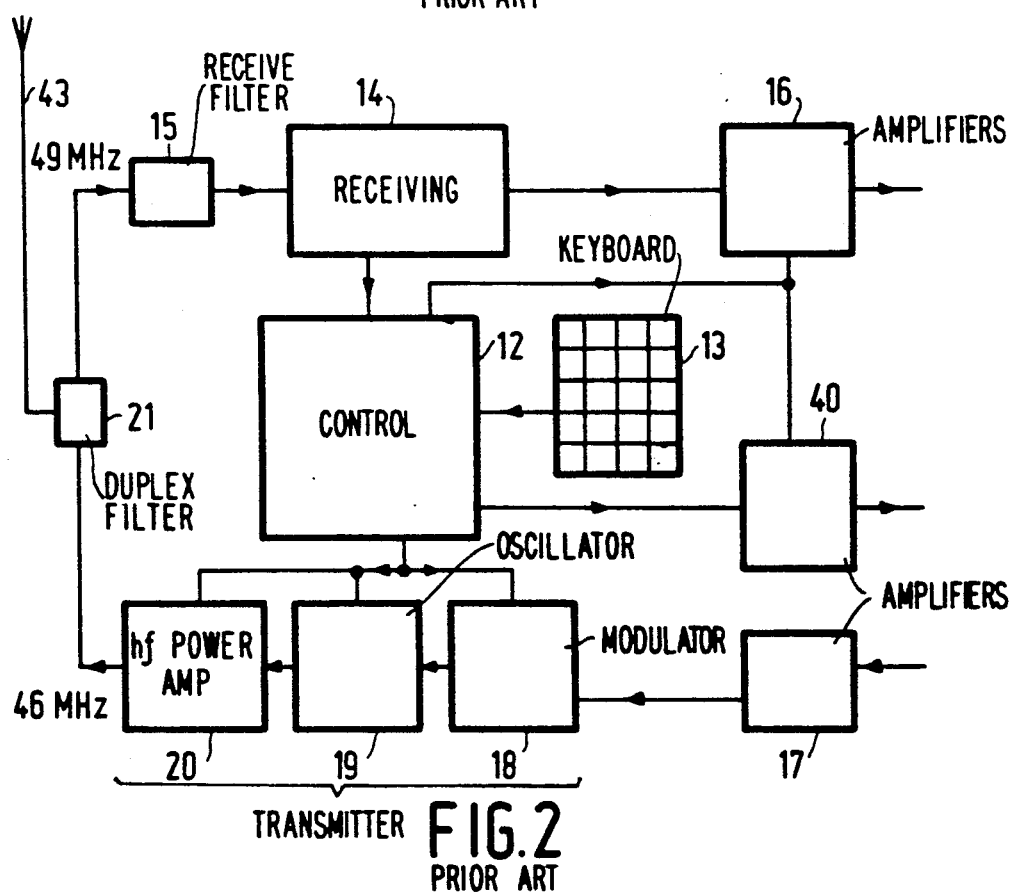
FIG. 2 is a block diagram of the hand held unit of the telephone set.

So far, the described cordless telephone set has been known, so that its operation need not be further discussed, be it observed that the control circuits 2 and 12 of the respective FIGS. 1 and 2 are programmed for scanning the respective keyboard means 3 and 13 for reading dial information and status information, just like the prior-art telephone set described in the above introductory part.

Figure 3:
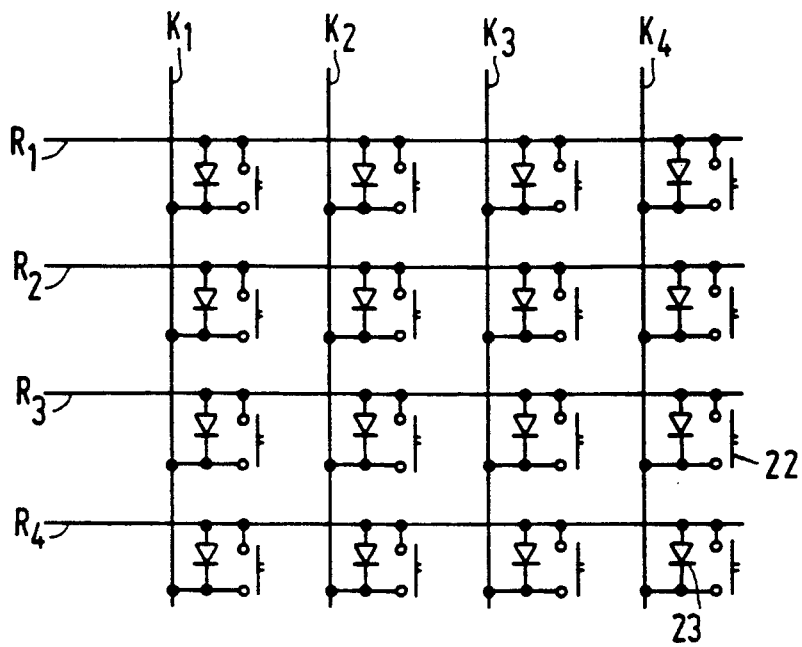
FIG. 3 is a diagram of a simple embodiment of the integrated key switch matrix/diode matrix according to the invention.
Figure 4:
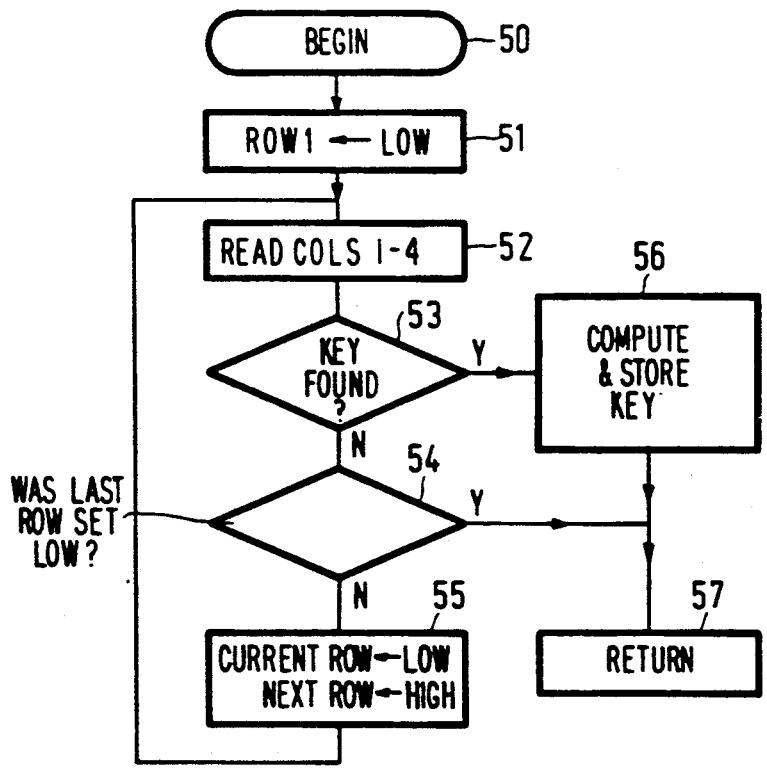
FIGS. 4 and 5 are flow charts of an optional routine for reading the key switch matrix of the integrated key switch matrix/diode matrix of FIG. 3.
Figure 5:
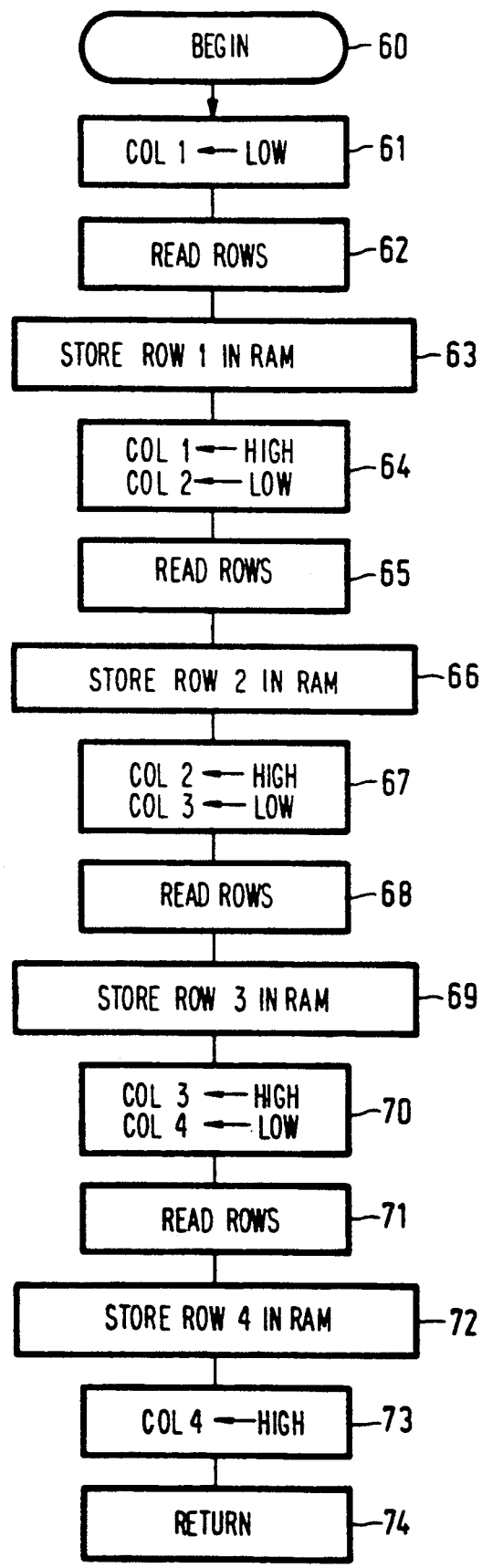

With reference to the drawing FIGS. 3-5, the invention will be further discussed as applied to the above-described prior-art cordless telephone set which comprises a modified keyboard means 3 and/or 13 in lieu of the prior-art 8-bit DIP microswitches for setting a security code (naturally comprising 8 bits).

FIG. 3 diagrammatically shows a relatively small integrated key switch matrix/diode matrix with four rows and four columns. With this matrix a 16-bit security code can thus be set by selectively omitting diodes 23. Needless to observe that the security code is to be read when none of the key switches 22 is closed. The security code can be set by physically removing one or a plurality of diodes 23. For example, it can be set by removing them mechanically or electrically, while inserting a switch element of a DIP microswitch arranged in series with the diodes 23. By means of this element, the diode 23 is switched off. Alternatively a fuse (not shown) may be inserted in series while diodes are switched off selectively by allowing the respective fuses to melt. It should be observed that the diode itself may form the fuse. Generally speaking, a matrix of setting units "23", conducting current in one direction, is connected to the matrix of key switches 22. The setting may be effected in a variety of ways which will doubtlessly be evident to those skilled in the art.

It is important to note that the diode matrix does not require more row and column conductors than already provided for the key switch matrix. As has been observed hereinbefore, the only thing that has to be done for implementing the integrated key switch matrix/diode matrix is adapting the programming of the control circuits 2, 12 when the two keyboard means 3 and 13 respectively, are modified according to the invention. As stated earlier, all diodes 23 of the diode matrix may be installed when the telephone set is manufactured. Alternatively, it is possible that the diodes to be installed selectively when the telephone set is manufactured, specifically in this case where it is a matter of security code. All keyboard terminals are preferably in/outputs that are set high.

The programming of the control circuits 2 and 12 will now be further discussed. Signals from the hand held unit of FIG. 2 are received by the base unit of FIG. 1 and returned (signalled back) to the hand held unit through the air. Once an initializing order is given with the hand held unit of FIG. 2, a 16-bit security code is transmitted to the basic unit of FIG. 1. This security code is verified in the control circuit 2 of the base unit of FIG. 1 and if found to be correct, the transmitter means 8, 9, 10 of the base unit of FIG. 1 is switched on and will return an acknowledge signal. Selecting and setting operations of the telephone set may be commenced upon reception of the acknowledge signal. The bits transmitted by the manually operated unit of FIG. 2 are signalled back bit by bit. All selection or function messages are followed by an 8-bit word which is equal to the first byte of the 2-byte security code. Instructions will only be carried out when the first byte of the security code is received correctly, which will then be signalled back by the base unit of FIG. 1 after which the cycle that has just been described can be repeated.

In order to avoid unacceptably long delays the protocol for data transmission from the basic unit of FIG. 1 to one or more manually operated units is different according to FIG. 2. With an incoming telephone call the security code is transmitted three times in a row. In the hand held unit of FIG. 2 these three security codes are stored and each bit is subjected to a majority check. The buzzer is switched on if the comparison has been made and the result of the majority check is equal to the stored security code, after which the hand held unit of FIG. 2 will generate the series of ringing tones.

When the base unit of FIG. 1 and/or the hand held unit of FIG. 2 are/is switched on, a 2-byte RAM location in the control circuit 2 and/or 12 will be overwritten by a 16-bit word which is read from the row conductors and column conductors of the integrated matrix shown in FIG. 3. Each time the hand held unit of FIG. 2 is placed on the base unit of FIG. 1 the above RAM locations will be overwritten so as to avoid disturbance signals (for example EMC) affecting this code setting.

FIGS. 4 and 5 are flow charts for routines for reading the respective key switch and the diode matrices of the integrated key switch matrix/diode matrix of FIG. 3, which routines in this case constitute the means for reading the integrated matrix of FIG. 3. Needless to say that, in addition to this software implementation, hardware implementation is also possible.

In FIG. 4 the read routine of the key switch matrix begins at step 50. At step 51 row 1 is set low. At step 52 the columns 1 to 4 are read. At step 53 a test is made whether a key is found. If there is, the central processor (not shown) in the control circuit 2 or 12 at step 56 computes and stores the key in the RAM memory (not shown) of the control circuit 2 or 12 and the routine returns at step 57. If step 53 shows a negative result, the routine will go to step 54, where tests are made to find whether it was the last row, that is, row 4, which was set low, and if it was, the routine will proceed to step 57 and if it was not, the routine will proceed to step 55 where the previous row is set high and the next row, in this case row 2, is set low and the routine will re-enter at step 52, which loop will be repeated until in step 55 row 4 is set low.

It is essential to the read routine of the key switch matrix shown in FIG. 4 that the columns of the integrated matrix of FIG. 3 be read. Instead of the columns, the rows are read in the read routine of the diode matrix shown in FIG. 5. Needless to observe that the columns may be called rows and vice versa, for which reason in the introductory part of the description and claims first and second conductors are mentioned whereas the key switch matrix is referenced the first matrix and the setting circuit matrix is referenced the second matrix. It is incidentally observed that when, for example, a key switch matrix of eight columns is used, as is done with the telephone set known from the introductory part of the description, a diode matrix of one row (diode series) could suffice for an 8-bit security code; and that in FIG. 3, for example, a fourth row could be provided with only key switches at the intersections of the columns 1 to 4, which switches would then be allowed to be closed when reading the diode matrix.

In FIG. 5 the read routine of the diode matrix begins at step 60. At step 61 column 1 is set low and the rows 1 to 4 are read at 62. At step 63 the data of row 1 are stored in the RAM memory (not shown) of the control circuit 2 or 12. At step 64 column 1 is set high and column 2 low. At step 65 the rows 1 to 4 are read and at step 66 the data of row 2 are stored in the same manner as step 63. At step 67 column 2 is set high and column 3 low. At step 68 again rows 1 to 4 are read and at step 69 the data of row 3 are again stored in the above manner. Finally, at step 70 column 3 is set high and column 4 low and at step 71 again the rows 1 to 4 are read, whereas at step 72 the data of row 4 are stored in the above manner, at step 73 column 4 is set high and the routine of the diode matrix is terminated with the return step 74.

Summarizing it may be stated that the control circuit 2 or 12 comprises scanning means which, when initializing, reads the rows and then the columns in the case of the integrated matrix of FIG. 3. It is likewise possible, when initializing, to read the columns first (still in the case of FIG. 3, which is to say with the polarity of the diodes 23 stated therein) in order to check whether a key switch 22 is closed and only if this is the case to read the columns and then the rows. This avoids an erroneous interpretation when, for example, a key has been touched during switching on. If this is the case, reading the diode matrix can be postponed until the release of the key has been scanned.

I claim:

1. An electronic telephone set comprising
   a) a transmission circuit for coupling to a telecommunication network and for receiving and transmitting speech signals,
   b) keyboard means comprising
      i) a first matrix which includes:
         A) at least one first conductor
         B) at least one second conductor intersecting the at least one first conductor; and
         C) key switches, disposed at intersections of respective first and second conductors, for coupling the respective first and second conductors to produce dialling information and status information;
      ii) a second matrix comprising
         A) at least one first conductor;
         B) at least one second conductor intersecting said at least one first conductor of the second matrix, said at least one second conductor being arranged in common with said at least one second conductor of the first matrix; and
         C) at least one setting circuit at at least one selected intersection between a respective pair of said first and second conductors of the second matrix, each setting circuit conducting in a same single direction; and
   c) a control circuit for: generating dialling signals compatible with the telecommunication network in response to the dialling information; and for controlling operation of the telephone set in response to the status information; which control circuit comprises scanning means for reading the two matrices,
   wherein the improvement comprises that all first conductors of the second matrix are in common with those of the first matrix and that the scanning means scan the first conductors when reading the first matrix and scan the second conductors when reading the second matrix.

2. Keyboard apparatus for use in a telephone set comprising
   a) a first matrix which includes:
      i) at least one first conductor
      ii) at least one second conductor intersecting the at least one first conductor; and
      iii) key switches, disposed at intersections of respective first and second conductors, for coupling the respective first and second conductors to produce dialling information and status information; and
   b) a second matrix comprising
      i) at least one first conductor;
      ii) at least one second conductor intersecting said at least one first conductor of the second matrix, said at least one second conductor being arranged in common with said at least one second conductor of said first matrix; and
      iii) at least one setting circuit at at least one selected intersection between a respective pair of said first and second conductors of the second matrix, each setting circuit conducting in a same single direction;
   wherein the improvement comprises that all first conductors of the second matrix are in common with those of the first matrix.

3. A method for scanning a matrix of conductors in a keyboard apparatus in a telephone set comprising the steps of
   a) storing information in the matrix by means of one-way circuits at intersections of the conductors;
   b) for using the matrix as a first matrix of the keyboard apparatus, scanning first conductors of the matrix; and
   c) for using the matrix as a second matrix of the keyboard apparatus, scanning second conductors of the matrix.

4. The method of claim 3 wherein scanning the first matrix comprises the steps of:
   i) setting a first first conductor to a first logic level;
   ii) reading data from all second conductors of the matrix;
   iii) setting a current first conductor to a second logic level;
   iv) if the current first conductor is not a last first conductor, setting a next first conductor to the first logic level, and returning to step ii).

5. The method of claim 4, wherein the first matrix is for storing a security key, the method further comprising, after the reading step, the steps of
   searching for a key, stored in the one-way circuits, from data read from the second conductors;
   computing and storing any key found in the searching step, and exiting; and
   stopping step b) if any key is found.

6. The method of claim 3 wherein the step of scanning the second matrix comprises the steps of:
   i) setting a first second conductor to the first logic level;
   ii) reading the first conductors;
   iii) storing a data from a first conductor;
   iv) setting a current second conductor to the second logic level; and
   v) if the current second conductor is not a last second conductor, setting a next second conductor to the first logic level, and returning to step ii).

* * * * *